United States Patent [19]
Kudo et al.

[11] Patent Number: 5,791,995
[45] Date of Patent: Aug. 11, 1998

[54] CONSTANT VELOCITY UNIVERSAL JOINT

[75] Inventors: Satoru Kudo; Shouichi Nakao; Atsushi Nagaoka; Tsutomu Kawakatsu; Takeshi Kayano, all of Mooka, Japan

[73] Assignee: Honda Giken Kogyo Kabushiki Kaisha, Tokyo, Japan

[21] Appl. No.: 796,543

[22] Filed: Feb. 6, 1997

[30] Foreign Application Priority Data

| Feb. 15, 1996 | [JP] | Japan | 8-028071 |
| Mar. 18, 1996 | [JP] | Japan | 8-061307 |
| Sep. 10, 1996 | [JP] | Japan | 8-238932 |

[51] Int. Cl.$^6$ .................................... F16D 3/205
[52] U.S. Cl. ............ 464/11; 464/111; 464/132; 464/905
[58] Field of Search ............ 464/11, 111, 120, 464/122, 123, 132, 905

[56] References Cited

U.S. PATENT DOCUMENTS

| 4,167,860 | 9/1979 | Sakaguchi et al. | 464/111 |
| 4,810,232 | 3/1989 | Farrell et al. | 464/111 |
| 4,881,923 | 11/1989 | Orain | 464/132 X |
| 5,069,653 | 12/1991 | Mizukoshi | 464/111 |
| 5,203,741 | 4/1993 | Turner et al. | 464/111 |
| 5,267,901 | 12/1993 | Jost et al. | 464/11 |
| 5,474,500 | 12/1995 | Girgui | 464/111 |

FOREIGN PATENT DOCUMENTS

| 2698928 | 6/1994 | France. | |
| 4034805 C1 | 11/1991 | Germany. | |
| G 92 18285 | 5/1994 | Germany. | |
| 4408812 A1 | 9/1994 | Germany. | |
| 4-4321 | 1/1992 | Japan | 464/11 |
| 4-145231 | 5/1992 | Japan | 464/111 |
| A4-282028 | 10/1992 | Japan. | |
| A5-215141 | 8/1993 | Japan. | |
| 2252144 | 7/1992 | United Kingdom. | |
| 2273332 | 6/1994 | United Kingdom | 464/11 |
| WO90/06451 | 6/1990 | WIPO. | |

OTHER PUBLICATIONS

Patent Abstracts of Japan; Publication No. 01288625; Publication Date: Nov. 20, 1989.

Patent Abstracts of Japan; Publication No. 54069643; Publication Date: Jun. 4, 1979.

*Primary Examiner*—Randolph A. Reese
*Assistant Examiner*—Eileen A. Dunn
*Attorney, Agent, or Firm*—Birch, Stewart, Kolasch & Birch, LLP

[57] ABSTRACT

A constant velocity universal joint includes a plurality of trunnions formed to have a spherical configuration and expanding toward guide grooves, cylindrical holders for surrounding the trunnions, to which roller members displaceable along said guide grooves are externally fitted, and cutouts formed on surfaces of the trunnions.

15 Claims, 18 Drawing Sheets

FIG. 10

◎ : EXTREMELY GOOD
○ : GOOD
× : DEFECTIVE

| ANGLE ($\theta_1, \theta_2$) | 1° | 1.5° | 2° | 3° | 4° | 5° | 6° | 7° | 8° | 9° | 10° |
|---|---|---|---|---|---|---|---|---|---|---|---|
| DURABILITY OF CONTACT PORTION | × | × | ○ | ◎ | ◎ | ◎ | ◎ | ◎ | ◎ | ◎ | ◎ |
| BACKLASH DUE TO GAP | ◎ | ◎ | ◎ | ◎ | ◎ | ◎ | ◎ | ◎ | ○ | × | × |

FIG.14

◎ : EXTREMELY GOOD
○ : GOOD
× : DEFECTIVE

| ANGLE (θ1, θ2) | 0.3° | 0.4° | 0.5° | 0.75° | 1° | 2° | 3° | 4° | 5° | 6° | 7° | 8° | 9° | 10° |
|---|---|---|---|---|---|---|---|---|---|---|---|---|---|---|
| DURABILITY OF CONTACT PORTION | × | × | ○ | ◎ | ◎ | ◎ | ◎ | ◎ | ◎ | ◎ | ◎ | ◎ | ◎ | ◎ |
| BACKLASH DUE TO GAP | ◎ | ◎ | ◎ | ◎ | ◎ | ◎ | ◎ | ◎ | ◎ | ◎ | ◎ | ○ | × | × |

5,791,995

CONSTANT VELOCITY UNIVERSAL JOINT

BACKGROUND OF THE INVENTION

1. Field of the Invention:

The present invention relates to a constant velocity universal joint for coupling a driving shaft and a driven shaft, to be used, for example, for a driving force-transmitting section of an automobile.

2. Description of the Related Art

A constant velocity universal joint has been hitherto used for a driving force-transmitting section of an automobile in order to transmit a rotary driving force or torque of a driving shaft to respective axles through a driven shaft.

Such a conventional constant velocity universal joint is based on, for example, technical concepts disclosed in Japanese Laid-Open Patent Publication Nos. 4-282028 and 5-215141. A system is adopted in Japanese Laid-Open Patent Publication Nos. 4-282028 and 5-215141, which comprises a trunnion formed to be spherical, in which the trunnion is surrounded by a cylindrical ring (holder). In this system, a surface of the spherical trunnion and an inner circumferential surface of the ring are formed to make point-to-point contact with each other.

However, in the case of the conventional constant velocity universal joint, when the trunnion is tilted at a predetermined angle with respect to the ring, the trunnion slides along the inner circumferential surface of the ring while maintaining the state of point-to-point contact. Namely, the trunnion is slidably displaced along an axial direction or along a direction substantially perpendicular to the axial direction while maintaining the state of point to-point contact at one point with respect to the ring. Such sliding displacement of the trunnion, which is made while maintaining the state of point-to-point contact at one point, scrapes off an oil film formed by lubricating oil enclosed in an outer member. As a result, a disadvantage arises in that the driving force is not smoothly transmitted from a driving shaft to a driven shaft.

On the other hand, when the driving force is transmitted from the driving shaft to the driven shaft while maintaining the state in which the trunnion and the ring make point-to-point contact at one point, the driving torque is concentrated on the contact point between the trunnion and the ring. As a result, a disadvantage arises in that the pressing force, which is applied to an inner circumferential surface of the ring to make point-to-point contact with the trunnion, becomes excessively large.

SUMMARY OF THE INVENTION

A general object of the present invention is to provide a constant velocity universal joint which makes it possible to more smoothly transmit the driving force from a driving shaft to a driven shaft even when the driven shaft is relatively inclined at a predetermined angle with respect to the driving shaft.

A principal object of the present invention is to provide a constant velocity universal joint which makes it possible to restrain the pressing force applied to an inner circumferential surface of a holder.

According to the present invention, when a trunnion is inclined at a predetermined angle with respect to a holder, the lubricating performance is maintained by the aid of an oil-reserving section formed between the holder and the trunnion. Accordingly, a contact portion between a surface of the trunnion and an inner circumferential surface of the holder is protected. As a result, the driving force can be more smoothly transmitted from a driving shaft to a driven shaft. Thus it is possible to obtain good transmitting efficiency.

Further, the force to press the inner circumferential surface of the holder is dispersed owing to the change in the contact portion between the holder and the trunnion to make contact at one point, two points, and a line segment. Accordingly, it is possible to restrain the pressing force.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 10 explanatorily shows a relationship between durability and backlash, obtained when the width of the cutout is changed.

FIG. 14 explanatorily shows a relationship between durability and backlash, obtained when the width of the cutout is changed in a state in which an increased amount of a lubricating oil is enclosed in an outer cup.

DESCRIPTION OF THE PREFERRED EMBODIMENTS

Figure 1:
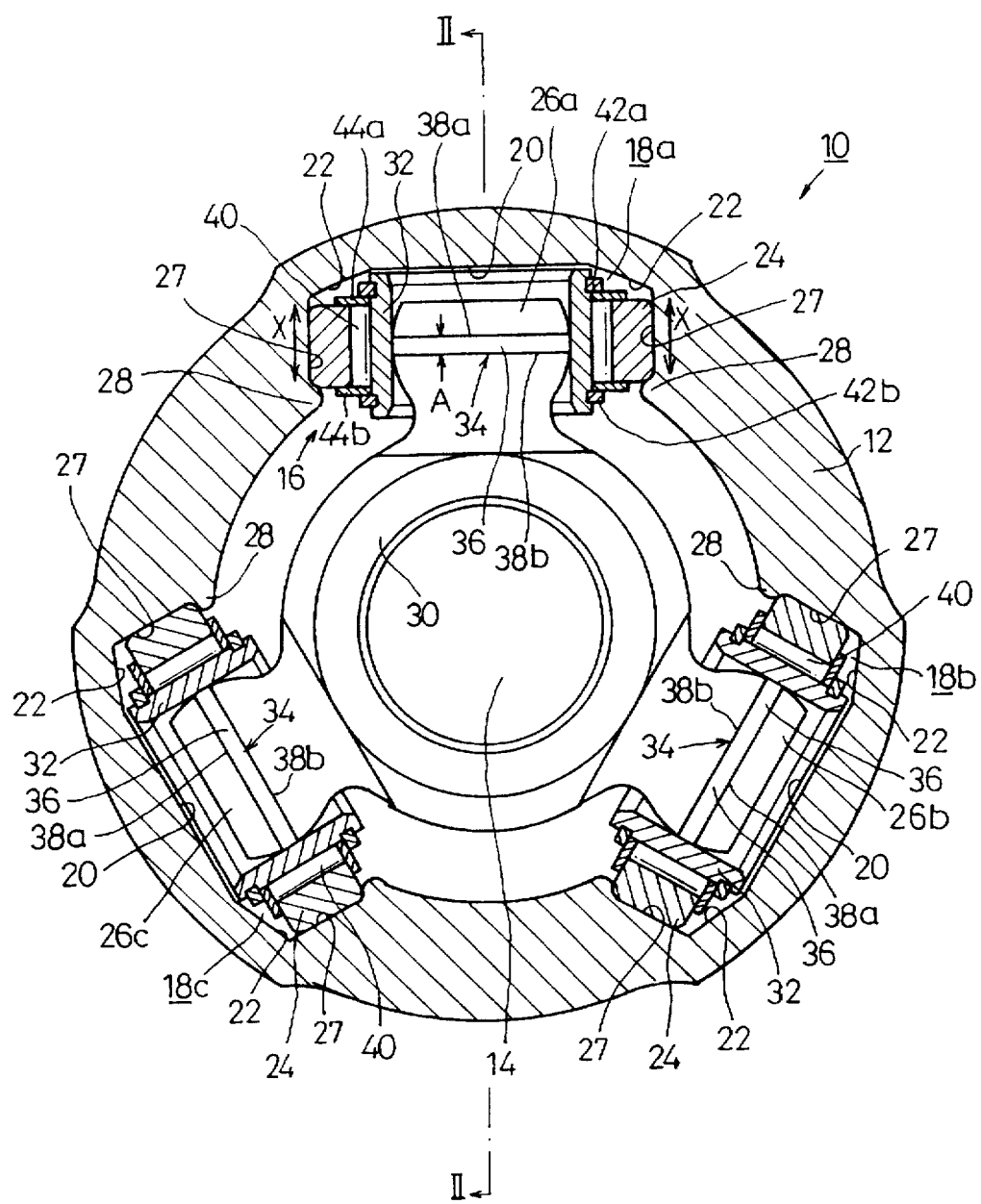
FIG. 1 shows a vertical cross-sectional view illustrating a constant velocity universal joint according to an embodiment of the present invention.
Figure 2:
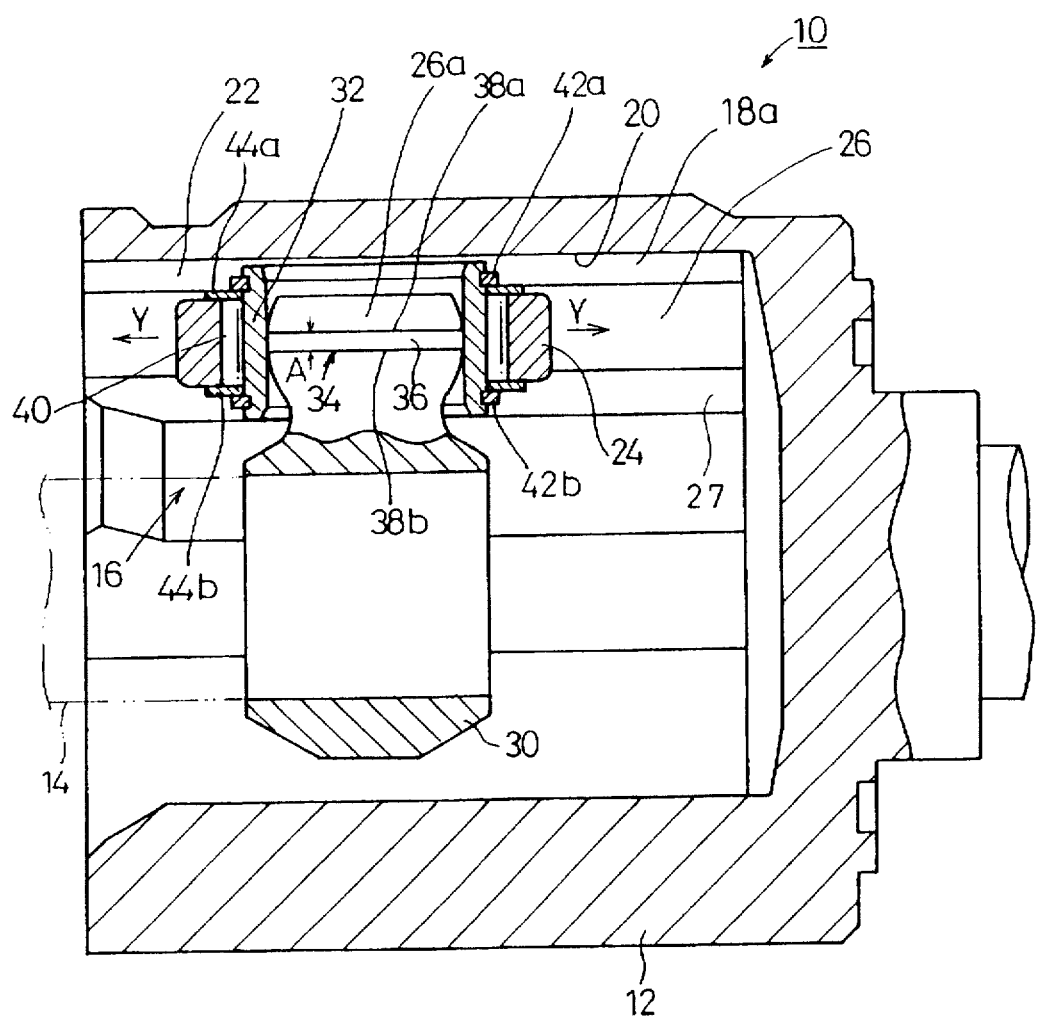
FIG. 2 shows a vertical cross-sectional view taken along a line II—II shown in FIG. 1.

In FIGS. 1 and 2, reference numeral 10 indicates a constant velocity universal joint according to an embodiment of the present invention. The constant velocity universal joint 10 basically comprises a cylindrical outer cup (outer member) 12 integrally coupled to one end of an unillustrated driving shaft and having an opening, and an inner member 16 secured to one end of a driven shaft 14 and accommodated in a hole of the outer cup 12.

Three guide grooves 18a to 18c are formed on an inner circumferential surface of the outer cup 12. The guide grooves 18a to 18c extend along an axial direction, and they are spaced apart from each other by an angle of 120 degrees about the axial center respectively. Each of the guide grooves 18a (18b, 18c) comprises a plane section 20 formed at a substantially central portion, an inclined section 22 formed to be inclined on both sides of the plane section 20 at a predetermined angle, and a rolling surface 27 formed to be substantially perpendicular to the plane section 20, for allowing a roller member 24 described later on to roll thereon. An end surface-regulating section 28, which protrudes toward the roller member 24 by a predetermined length for regulating the angle of inclination of the roller member 24, is formed at a lower portion of the rolling surface 27.

A ring-shaped spider 30 is externally fitted to the driven shaft 14. Three trunnions 26a (26b, 26c), which expand toward the guide grooves 18a (18b, 18c) and are spaced apart from each other by an angle of 120 degrees about the axial center respectively, are secured to an outer circumferential surface of the spider 30. Each of the trunnions 26a (26b, 26c) is formed to be spherical and surrounded by a cylindrical holder 32 with a predetermined clearance intervening therebetween.

Figure 3:
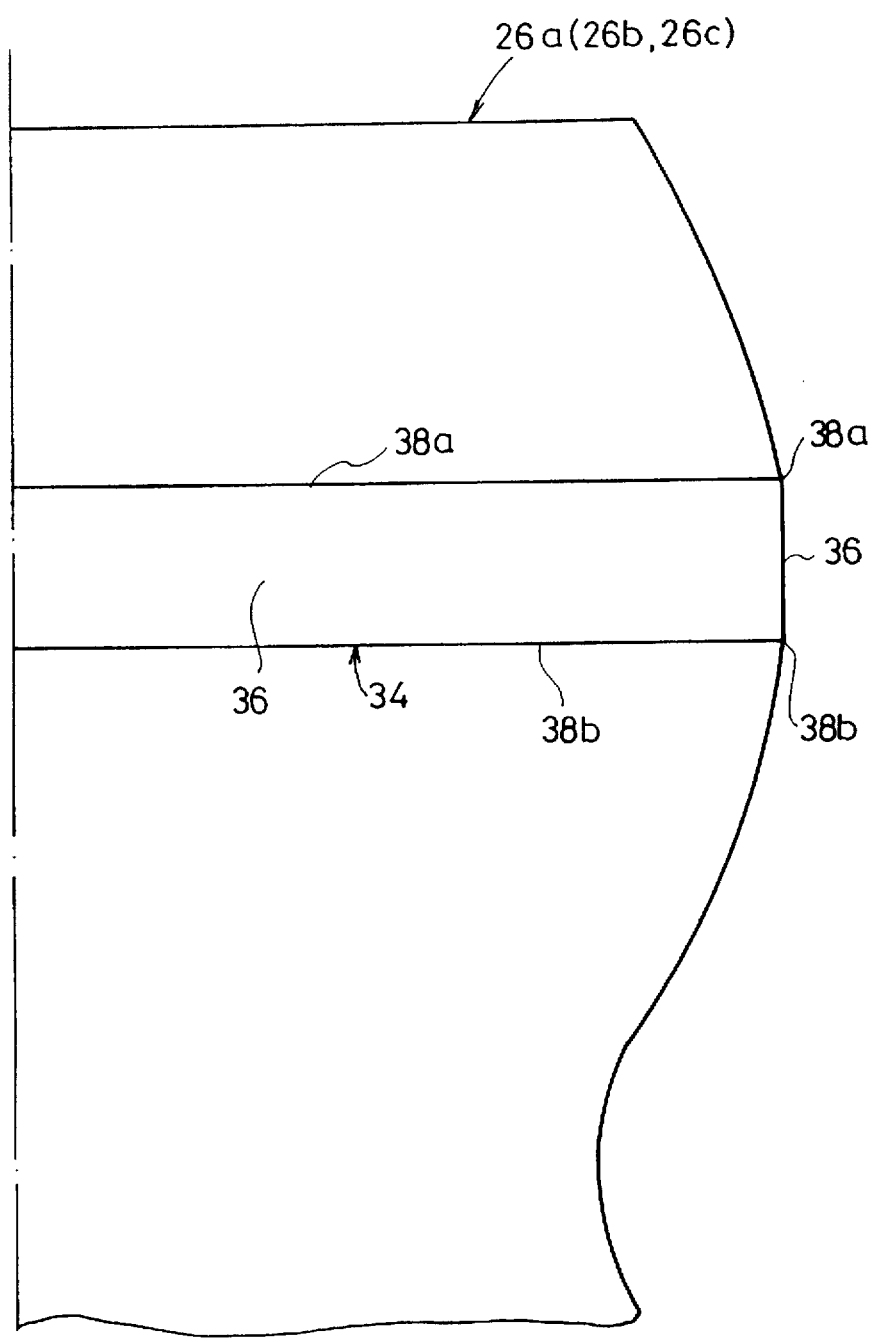
FIG. 3 shows an enlarged view, with partial omission, illustrating a cutout formed on a trunnion for constructing the constant velocity universal joint shown in FIG. 1.

The trunnion 26a (26b, 26c) is tiltable within a predetermined angle with respect to the holder 32. An oil-reserving section, which has a predetermined width A and extends along a direction substantially perpendicular to the axis, is formed at a portion having the longest circumference on the trunnion 26a (26b, 26c). The oil-reserving section is composed of a cutout 34 formed by chamfering the portion having the longest circumference on the surface of the trunnion 26a (26b, 26c). The cutout 34 comprises a circumferential section 36 having a substantially linear cross section formed by cutting out the spherical surface in the circumferential direction, and first and second annular ridges 38a, 38b provided at both ends of the circumferential section 36 along its widthwise direction to form boundaries between the circumferential section 36 and the spherical surface (see FIG. 3). In this embodiment, the cutout 34 is formed such that it makes point-to-point contact at one or two points or makes line-to-line contact with the inner circumferential surface of the holder 32 as described later on.

An upper end of the holder 32 is formed such that the upper end is capable of abutting against and being separated from the plane section 20 of the guide groove 18a (18b, 18c). Namely, the upper end of the holder 32 is positioned, in an ordinary state, to have a slight clearance with respect to the plane section 20 of the guide groove 18a (18b, 18c). Further, the upper end of the holder 32 is formed to abut against the plane section 20 when the driving shaft or the driven shaft 14 is relatively inclined at a predetermined angle.

The roller member 24 is externally fitted to an outer circumferential section of the holder 32 through a plurality of needle bearings 40. The roller member 24 has its outer circumferential surface with a cross section formed to be linear corresponding to the cross-sectional configuration of the guide groove 18a (18b, 18c). The respective needle bearings 40 and the roller member 24 are held by a set of circlips 42a, 42b and washers 44a, 44b fitted to annular grooves of the holder 32. It is possible to hold the needle bearings 40 and the roller member 24 only by using the circlips 42a, 42b without using the washers 44a, 44b.

The outer circumferential surface of the roller member 24 makes line-to-line contact with the rolling surface 27 of the guide groove 18a (18b, 18c). Thus the roller member 24 is slidable in its axial direction (in a direction indicated by an arrow X in FIG. 1). Moreover, the roller member 24 is rollable laterally (in a direction indicated by an arrow Y in FIG. 2) along the rolling surface 27.

The constant velocity universal joint 10 according to the embodiment of the present invention is basically constructed as described above. Now, the operation, function, and effect of the constant velocity universal joint 10 will be explained.

When the unillustrated driving shaft is rotated, its rotary driving force or torque is transmitted to the inner member 16 through the outer cup 12. Accordingly, the driven shaft 14 is rotated in a predetermined direction by the aid of the trunnions 26a to 26c formed to have the spherical configuration.

Namely, the rotary driving force of the outer cup 12 is transmitted to the roller members 24 which are displaceable along the guide grooves 18a (18b, 18c). The force is further transmitted to the trunnions 26a (26b, 26c) through the holders 32 held by the roller members 24. Thus the driven shaft 14 is rotated.

In this operation, if the unillustrated driving shaft or the driven shaft 14 is inclined, the roller members 24 roll along the guide grooves 18a to 18c. Accordingly, the velocity of rotation of the driving shaft is not affected by the angle of inclination of the driven shaft 14 with respect to the outer cup 12, and the force is always transmitted to the driven shaft 14 at a constant velocity of rotation.

Now, FIGS. 4 to 7 show the change in state of inclination of the trunnion 26a (26b, 26c) at a predetermined angle with respect to the holder 32. It is assumed in FIGS. 4 to 7 that the driving torque is applied in a direction substantially perpendicular to the plane of the drawings, from the front to the back of the drawings.

Figure 4:
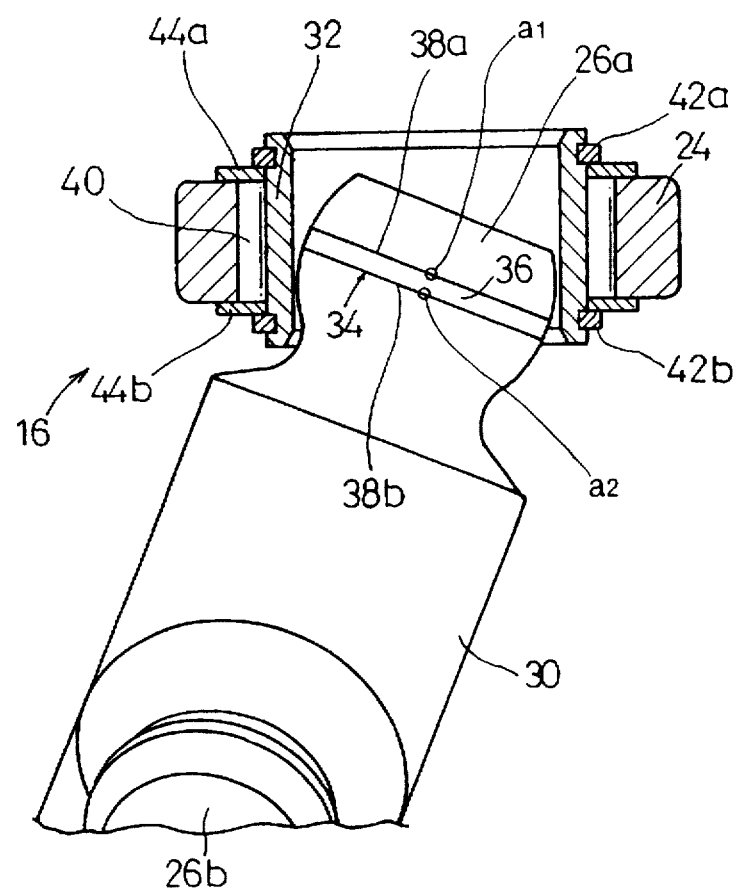
FIG. 4 shows a cross-sectional view, with partial omission, illustrating a state in which the trunnion is inclined at a predetermined angle with respect to a holder.

When the trunnion 26a (26b, 26c) is inclined at a predetermined angle as shown in FIG. 4, the inner circumferential surface having the columnar configuration of the holder 32 and the first and second annular ridges 38a, 38b of the trunnion 26a (26b, 26c) make point-to-point contact at two points point $a_1$ and point $a_2$. As a result of the inclination of the axis of the trunnion 26a (26b, 26c) at a predetermined angle with respect to the axis of the holder 32, a state is given in which the trunnion 26a (26b, 26c) makes the point-to-point contact at the two points of the point a, and the point $a_2$.

In the state shown in FIG. 4, the surface of the trunnion 26a (26b, 26c) is not contacted with the inner circumferential surface of the holder 32 at all portions except for the point $a_1$ and the point $a_2$. Therefore, a clearance (for example, 70 μ to 100 μ) is formed between the surface of the trunnion 26a (26b, 26c) and the inner circumferential surface of the holder 32 except for the point $a_1$ and the point $a_2$. Accordingly, a lubricating oil enclosed in the outer cup 12 enters the clearance. As a result, an oil film formed by the lubricating oil is allowed to exist between the surface of the trunnion 26a (26b, 26c) and the inner circumferential surface of the holder 32. Thus the surface of the trunnion 26a (26b, 26c) and the inner circumferential surface of the holder 32 are protected by the oil film respectively.

Figure 5:
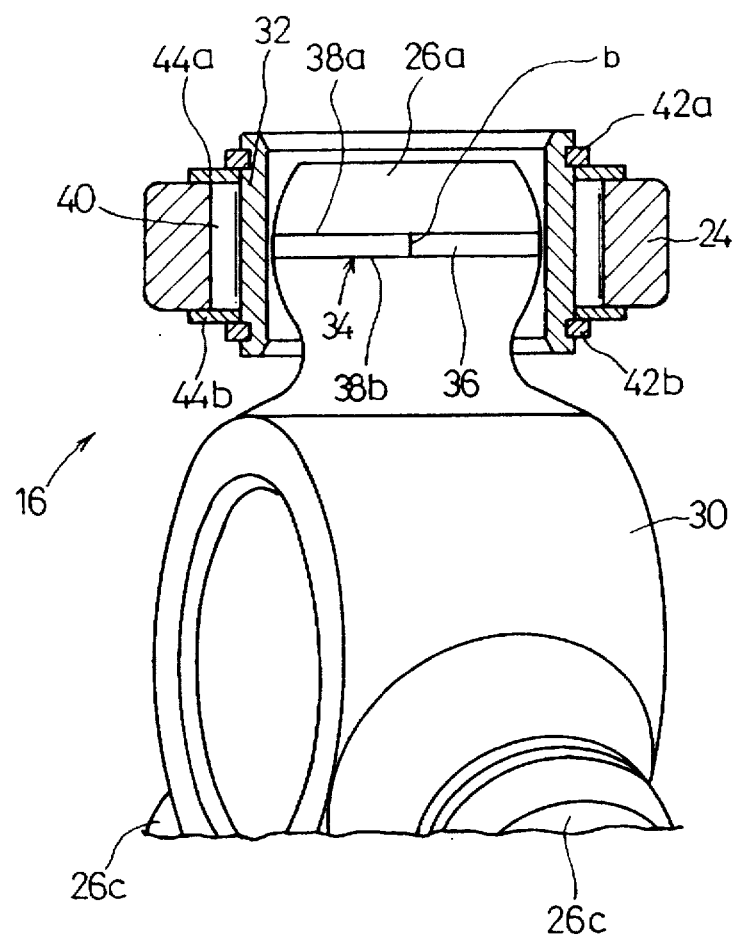
FIG. 5 shows a cross-sectional view, with partial omission, illustrating a state changed from the state shown in FIG. 4, in which an axis of the holder is coincident with an axis of the trunnion.

Next, when the trunnion 26a (26b, 26c) is inclined at a predetermined angle as shown in FIG. 5, the axis of the holder 32 is coincident with the axis of the trunnion 26a (26b, 26c), giving a state in which the inner circumferential surface of the holder 32 and the circumferential section 36 of the trunnion 26a (26b, 26c) make line-to-line contact at a line segment b. At this moment, the portion to make the line-to-line contact is protected by the oil film intervening between the inner circumferential surface of the holder 32 and the circumferential section 36 of the trunnion 26a (26b, 26c) in the state shown in FIG. 4. It is noted that the oil film for protecting the circumferential section 36 is not scraped off in the state shown in FIG. 4 because the circumferential section 36 does not contact with the inner circumferential surface of the holder 32. In the state shown in FIG. 5, the surface of the trunnion 26a (26b, 26c) is not contacted with the inner circumferential surface of the holder 32 at all portions except for the line segment b. Thus an oil film exists thereon, which is formed by the lubricating oil having entered the clearance.

Figure 6:
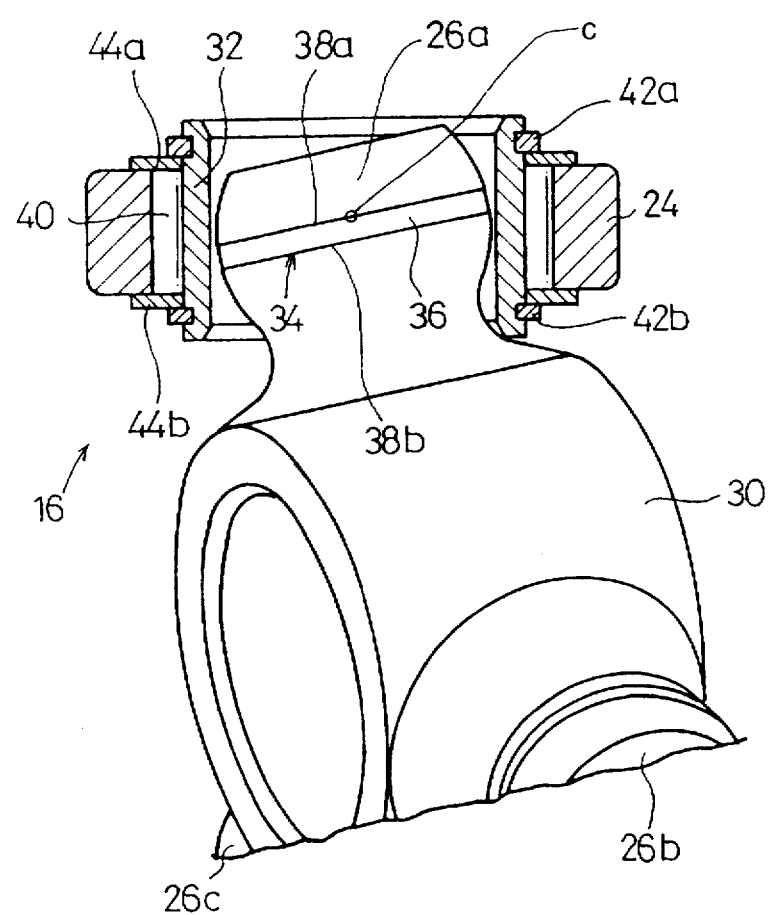
FIG. 6 shows a cross-sectional view, with partial omission, illustrating a state in which the trunnion is inclined at a predetermined angle with respect to the holder.

Next, when the trunnion 26a (26b, 26c) is inclined at a predetermined angle as shown in FIG. 6, a state is given in which the inner circumferential surface of the holder 32 and the surface of the trunnion 26a (26b, 26c) make point-to-point contact at one point of a point c. Namely, the inner circumferential surface of the holder 32 and the first annular ridge 38a of the trunnion 26a (26b, 26c) make the point-to-point contact at the point c. At this moment, the portion to make the point-to-point contact is protected by the oil film having intervened in the state shown in FIG. 5. In the state shown in FIG. 6, the holder 32 is not contacted with the trunnion 26a (26b, 26c) at all portions except for the point c. Thus an oil film exists thereon, which is formed by the lubricating oil having entered the clearance.

Figure 7:
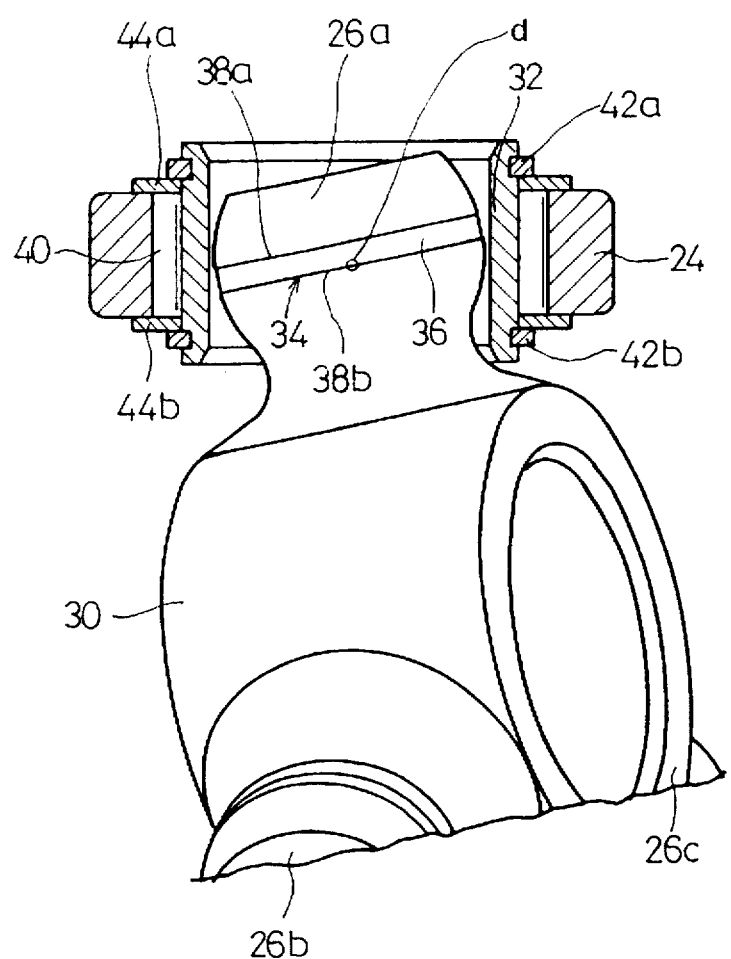
FIG. 7 shows a cross-sectional view, with partial omission, illustrating a state in which the trunnion is inclined at a predetermined angle with respect to the holder.

Next, when the trunnion 26a (26b, 26c) is inclined at a predetermined angle as shown in FIG. 7, a state is given in which the inner circumferential surface of the holder 32 and the surface of the trunnion 26a (26b, 26c) make point-to-point contact at one point of a point d. Namely, the inner circumferential surface of the holder 32 and the second annular ridge 38b of the trunnion 26a (26b, 26c) make the point-to-point contact at the point d. At this moment, the portion to make the point-to-point contact at the point d is protected by the oil film having intervened in the state shown in FIG. 6. It is noted that the oil film for protecting the second annular ridge 38b is not scraped off in the state shown in FIG. 6 because the second annular ridge 38b does not make contact with the inner circumferential surface of the holder 32. In the state shown in FIG. 7, the holder 32 is not contacted with the trunnion 26a (26b, 26c) at all portions except for the point d as well. Thus an oil film exists thereon, which is formed by the lubricating oil having entered the clearance.

As described above, when the trunnion 26a (26b, 26c) is inclined at a predetermined angle with respect to the holder 32, the inner circumferential surface of the holder 32 and the surface of the trunnion 26a (26b, 26c) undergo a change in contact state including the state of point-to-point contact at the two points (see FIG. 4), the state of line-to-line contact at the line segment b (see FIG. 5), and the state of point-to-point contact at the one point (see FIGS. 6 and 7), wherein the contact portion is protected by the oil film intervening between the surface of the trunnion 26a (26b, 26c)) holder and the inner circumferential surface of the holder 32 in response to the foregoing change. As a result, the driving force can be more smoothly transmitted from the driving shaft to the driven shaft 14, and thus good transmitting efficiency can be obtained.

In addition, the pressing force exerted on the inner circumferential surface of the holder 32 is dispersed owing to the change of the contact portion between the holder 32 and the trunnion 26a (26b, 26c) to make contact at the one point, two points, and line segment. Thus it is possible to restrain the pressing force.

Now, the width A of the cutout 34 formed on the surface of each of the trunnions 26a, 26b, 26c will be explained (see FIGS. 8 to 10).

Figure 8:
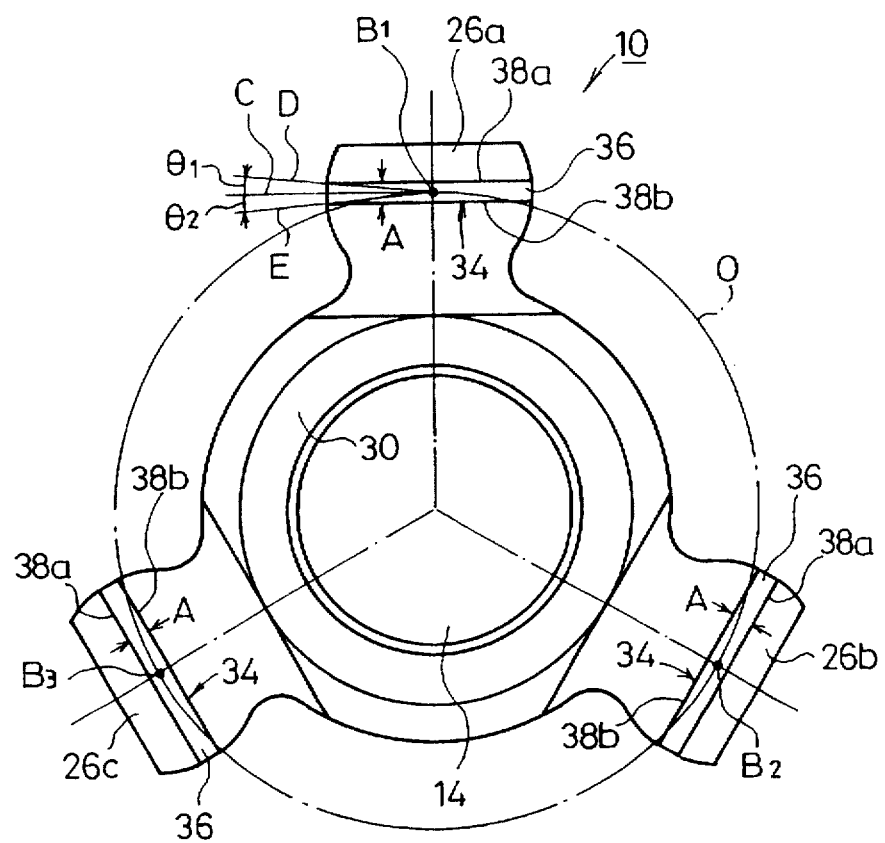
FIG. 8 explanatorily shows an illustration for setting a width of the cutout.
Figure 9:
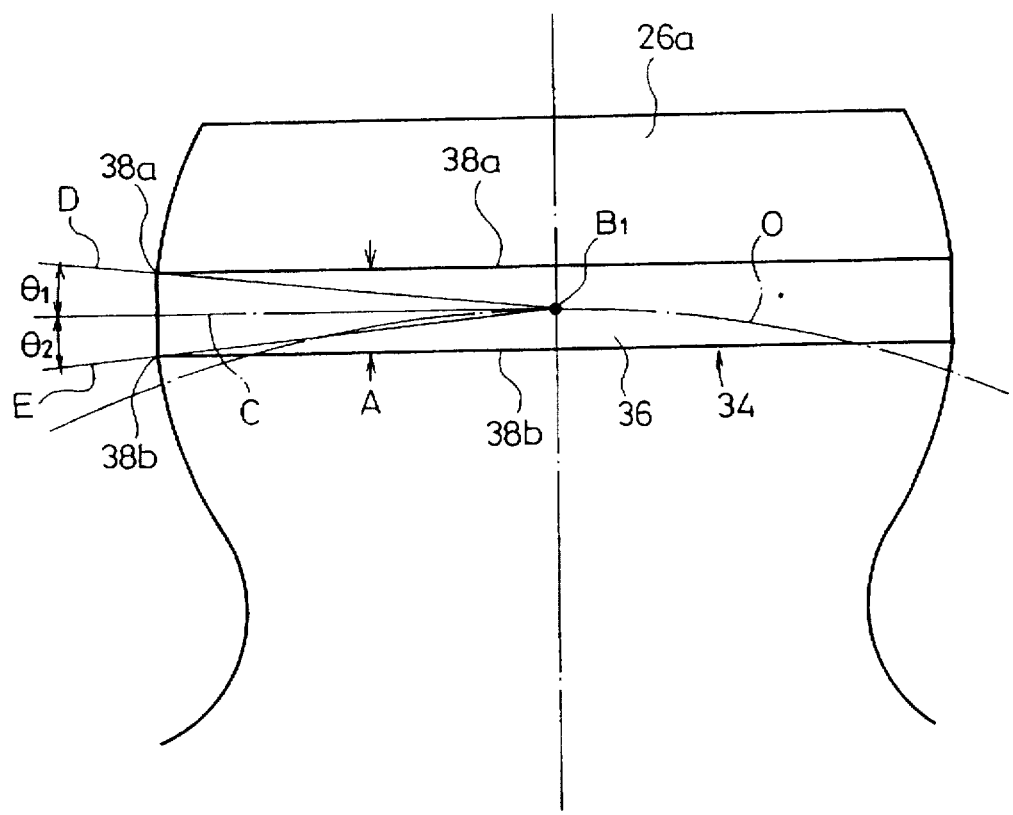
FIG. 9 shows a partial enlarged view of the trunnion shown in FIG. 8.

At first, a circle o, which connects centers $B_1$ to $B_3$ of the plurality of the trunnions 26a, 26b, 26c, is drawn (see FIG. 8). A tangential line C, which contacts with the circle o, is depicted. Next, first and second lines D, E, which form angles $\theta_1$ and $\theta_2$ respectively, are drawn from the center $B_1$ ($B_2$, $B_3$) of the trunnion 26a (26b, 26c) on the basis of the tangential line C. Intersections between the phantom lines D, E and the spherical surface of the trunnion 26a (26b, 26c) are designated as the first and second ridges 38a, 38b respectively. A spacing distance between the first and second ridges 38a, 38b is designated as the width A of the cutout 34 (circumferential section 36) (see FIG. 9).

In this embodiment, as shown in FIG. 10, if each of the angles of $\theta_1$ and $\theta_2$ is set to be in a range from 1 degree to 1.5 degree (the sum of the angles of $\theta_1$ and $\theta_2$ is 2 degrees to 3 degrees), the durability of the contact portion is deteriorated due to the frictional force generated between the trunnion 26a (26b, 26c) and the holder 32. Accordingly, each of the angles of $\theta_1$ and $\theta_2$ is preferably not less than about 2 degrees (the sum of the angles of $\theta_1$ and $\theta_2$ is not less than about 4 degrees). On the other hand, if each of the angles of $\theta_1$ and $\theta_2$ is set to be not less than 9 degrees (the sum of the angles of $\theta_1$ and $\theta_2$ is not less than 18 degrees), backlash occurs due to the gap formed between the trunnion 26a (26b, 26c) and the holder 32. Accordingly, each of the angles of $\theta_1$ and $\theta_2$ is preferably not more than about 8 degrees (the sum of the angles of $\theta_1$ and $\theta_2$ is not more than about 16 degrees).

Therefore, the first and second annular ridges 38a, 38b are formed in a range in which each of the angles of $\theta_1$ and $\theta_2$ has a lower limit of about 2 degrees and an upper limit of about 8 degrees (the angle formed between the first and second lines D, E in a plane including the tangential line C is in a range of about 4 degrees to about 16 degrees). Thus the width A of the cutout 34 (circumferential section 36) is set by the spacing distance between the first and second ridges 38a, 38b.

Next, the width A of the cutout 34 (circumferential section 36), obtained when the amount of the lubricating oil enclosed in the outer cup 12 is increased by 10% to 15% as compared with an ordinary state, will be explained.

In this embodiment, as shown in FIG. 14, if each of the angles of $\theta_1$ and $\theta_2$ is set to be less than 0.5 degree (the sum of the angles of $\theta_1$ and $\theta_2$ is less than 1 degree), the durability of the contact portion is deteriorated due to the frictional force generated between the trunnion 26a (26b, 26c) and the holder 32. Accordingly, each of the angles of $\theta_1$ and $\theta_2$ is preferably not less than about 0.5 degree (the sum of the angles of $\theta_1$ and $\theta_2$ is not less than about 1 degree).

On the other hand, if each of the angles of $\theta_1$ and $\theta_2$ is set to be not less than 9 degrees (the sum of the angles of $\theta_1$ and $\theta_2$ is not less than 18 degrees), backlash occurs due to the gap formed between the trunnion 26a (26b, 26c) and the holder 32. Accordingly, each of the angles of $\theta_1$ and $\theta_2$ is preferably not more than about 8 degrees (the sum of the angles of $\theta_1$ and $\theta_2$ is not more than about 16 degrees).

Therefore, when the amount of the lubricating oil enclosed in the outer cup 12 is increased by a predetermined amount, the first and second annular ridges 38a, 38b are formed in a range in which each of the angles of $\theta_1$ and $\theta_2$ has a lower limit of about 0.5 degree and an upper limit of about 8 degrees (the angle formed between the first and second lines D, E in a plane including the tangential line C is in a range of about 1 degrees to about 16 degrees). Thus the width A of the cutout 34 (circumferential section 36) is preferably set by the spacing distance between the first and second ridges 38a, 38b.

As described above, an advantage is obtained in that the width of the cutout 34 (circumferential section 36) can be decreased when the amount of the lubricating oil enclosed in the outer cup 12 is increased by a predetermined amount as compared with an ordinary state.

Figure 11:
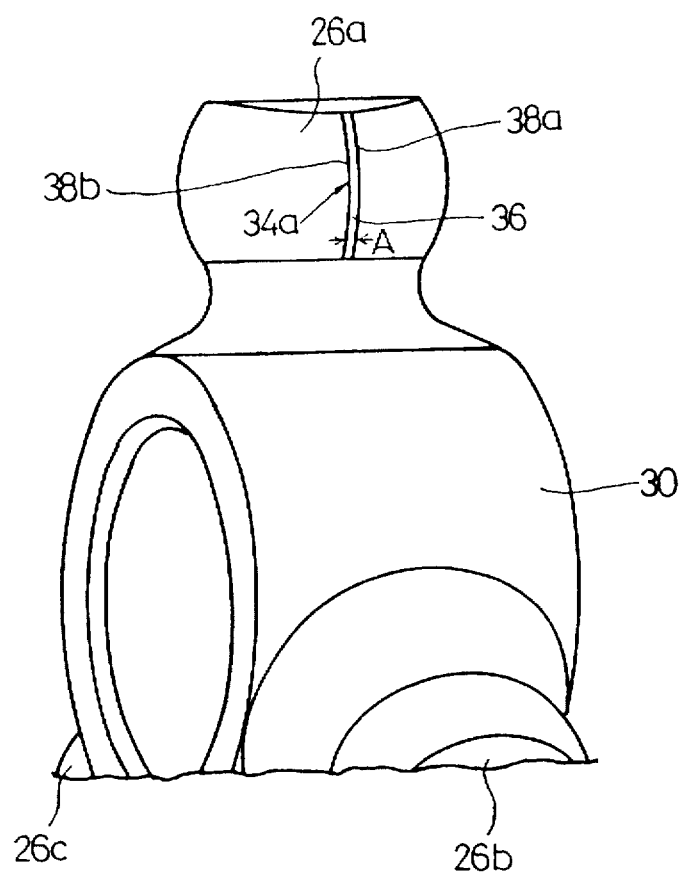
FIG. 11 shows a perspective view illustrating a modified embodiment of the oil-reserving section formed on the trunnion.
Figure 12:
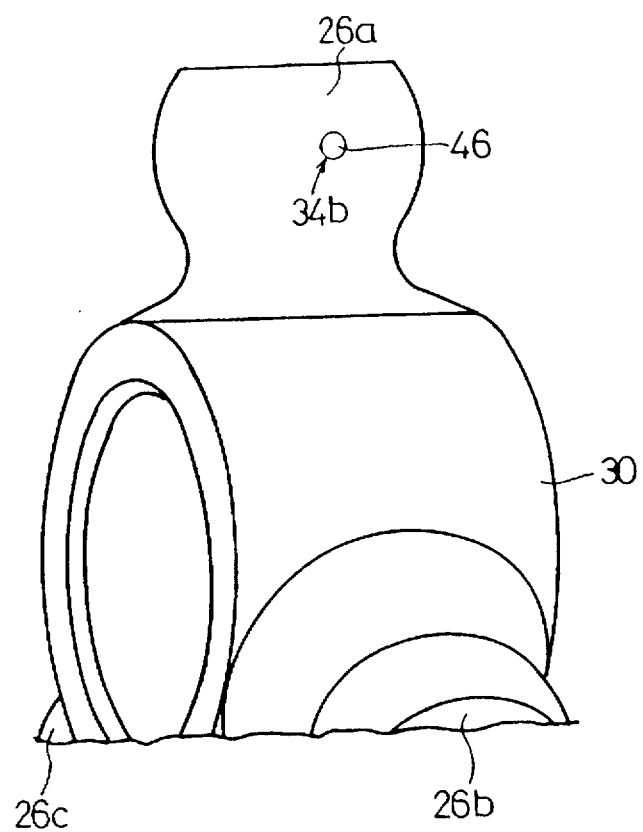
FIG. 12 shows a perspective view illustrating a modified embodiment of the oil-reserving section formed on the trunnion.
Figure 13:
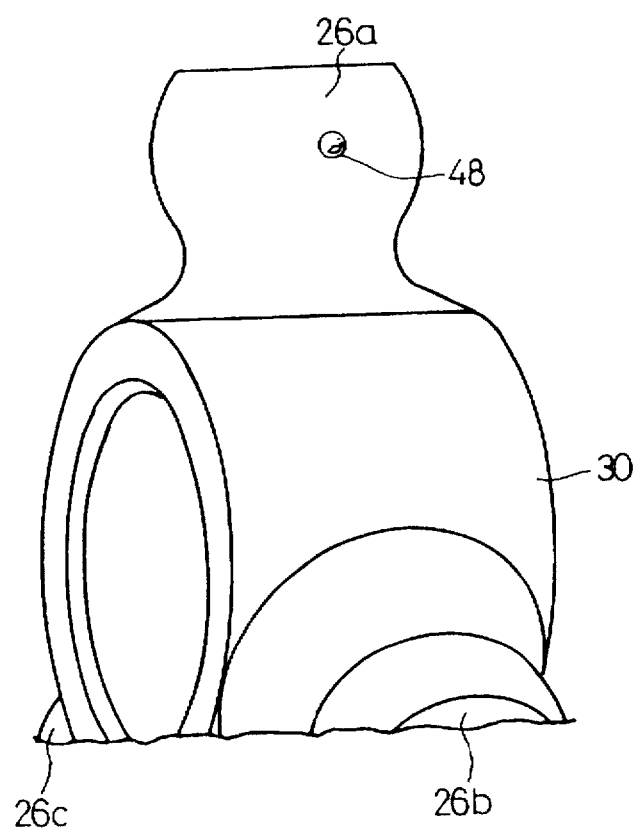
FIG. 13 shows a perspective view illustrating a modified embodiment of the oil-reserving section formed on the trunnion.

In this embodiment, explanation has been made by using the cutout 34 which extends in the direction substantially perpendicular to the axis of the trunnion 26a (26b, 26c). However, there is no limitation thereto. Alternatively, as shown in FIG. 11, a cutout 34a may be provided, which extends along the axis of the trunnion 26a (26b, 26c). Further alternatively, as shown in FIG. 12, a cutout 34b may be provided, in which a circular flat section 46 is formed at the transmitting point for the driving force. Further alternatively, in place of the flat section 46, the spherical surface may be formed with a substantially circular recess, or a substantially circular bulge 48 having a predetermined curvature exceeding a curvature of the spherical surface (see FIG. 13).

Other modified embodiments of the oil-reserving section formed on the surface of the trunnion 26a (26b, 26c) are shown in FIGS. 15 to 22.

Figure 15:
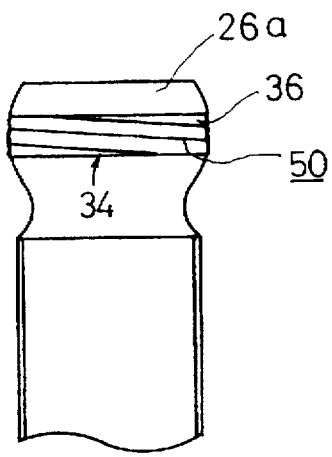
FIG. 15 shows a front view, with partial omission, illustrating a modified embodiment of the oil-reserving section formed on the trunnion.
Figure 16:
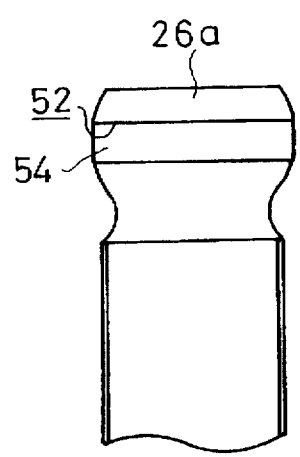
FIG. 16 shows a front view, with partial omission, illustrating a modified embodiment of the oil-reserving section formed on the trunnion.
Figure 17:
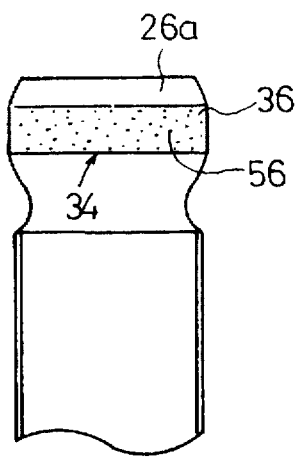
FIG. 17 shows a front view, with partial omission, illustrating a modified embodiment of the oil-reserving section formed on the trunnion.
Figure 18:
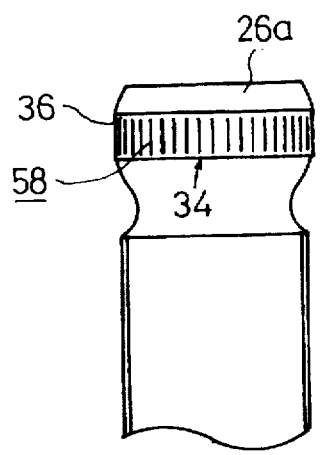
FIG. 18 shows a front view, with partial omission, illustrating a modified embodiment of the oil-reserving section formed on the trunnion.

In FIG. 15, a helical groove 50 is formed on the circumferential section 36 of the cutout 34 shown in FIG. 1. In FIG. 16, a sintered alloy 54 is embedded and formed in an annular groove 52 provided along the spherical surface. In FIG. 17, a plurality of irregularities 56 are formed by shot peening on the circumferential section 36 of the cutout 34 shown in FIG. 1. In FIG. 18, a plurality of linear grooves 58 are formed so that they are spaced apart from each other by a predetermined spacing along the circumferential section 36. Thus it is possible to further improve the lubricating performance.

Figure 19:
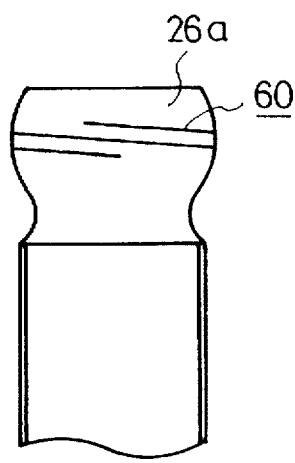
FIG. 19 shows a front view, with partial omission, illustrating a modified embodiment of the oil-reserving section formed on the trunnion.
Figure 20:
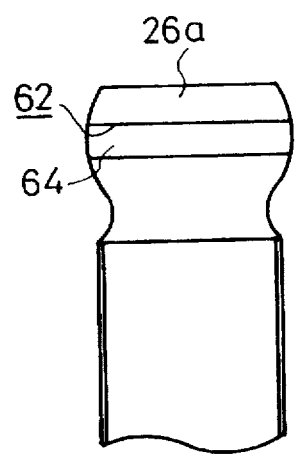
FIG. 20 shows a front view, with partial omission, illustrating a modified embodiment of the oil-reserving section formed on the trunnion.
Figure 21:
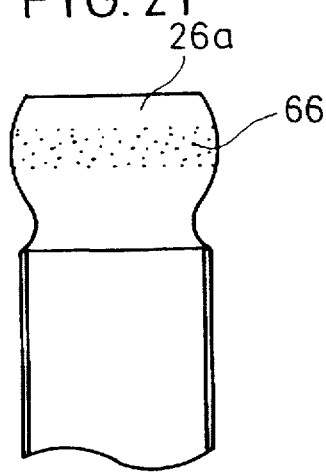
FIG. 21 shows a front view, with partial omission, illustrating a modified embodiment of the oil-reserving section formed on the trunnion.
Figure 22:
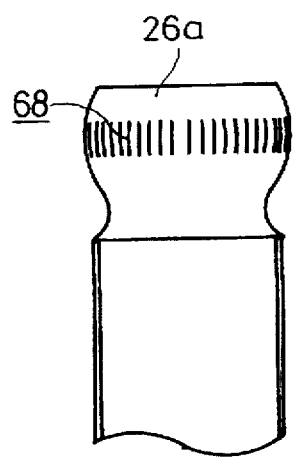
FIG. 22 shows a front view, with partial omission, illustrating a modified embodiment of the oil-reserving section formed on the trunnion.

As shown in FIGS. 19 to 22, the following configurations are also preferred, in each of which the circumferential section 36, which is cut out along the spherical surface of the trunnion 26a (26b, 26c), is not provided. Namely, a helical groove 60 is directly formed on the spherical surface of the trunnion 26a (26b, 26c) (FIG. 19). A sintered alloy 64 is embedded and formed in a spherical surface 62 on the spherical trunnion 26a (26b, 26c) (FIG. 20). A plurality of irregularities 66 are formed by shot peening so that they encircle the spherical trunnion 26a (26b, 26c) along the circumferential direction (FIG. 21). A plurality of linear grooves 68 are formed so that they are spaced apart from each other by a predetermined spacing along the circumferential direction of the spherical surface of the trunnion 26a (26b, 26c) (FIG. 22). In the foregoing, the lubricating performance for the holder 32 and the trunnion 26a (26b, 26c) is maintained by the lubricating oil reserved in the helical groove 60, the irregularities 66, or the groove 68, or by the lubricating oil seeping out from the sintered alloy.

The entire spherical surface or the circumferential section 36 of the trunnion 26a (26b, 26c) may be subjected to, for example, formation of a molybdenum layer by means of plasma spraying with molybdenum (Mo), or subjected to, for example, application of composite dispersion plating treatment (for example, a surface is plated with a metal plating solution obtained by dispersing SiN therein), or sulphurizing nitriding treatment. Thus the oil-keeping property and the conformability of the lubricating oil can be improved.

In this embodiment, the cutout 34 is formed to be flat. However, the cutout 34 may be formed as a recess which is concave with respect to the spherical surface. Alternatively, the cutout 34 may be formed as a bulge which has a predetermined curvature exceeding a curvature of the spherical surface. When the cutout 34 is formed as a recess, the contact with the holder 32 only includes point-to-point contact at two points.

What is claimed is:

1. A constant velocity universal joint having a cylindrical outer member coupled to one transmitting shaft and having, on an inner circumferential surface, a plurality of guide grooves spaced apart from each other by a predetermined spacing and extending along an axial direction, and an inner member coupled to the other transmitting shaft and inserted into an opening inner space of said outer member, said constant velocity universal joint comprising:

a plurality of trunnions each having a spherical surface and expanding toward said guide grooves;

cylindrical holders for surrounding said trunnions, to which roller members displaceable along said guide grooves are externally fitted; and an oil-reserving section disposed on each of said trunnions at a position at which said trunnions contact with inner wall surfaces of said holders, said oil-reserving section extending in a direction substantially perpendicular to an axis of said trunnion.

2. The constant velocity universal joint according to claim 1, wherein said oil-reserving section is composed of a cutout formed on said surface of said trunnion, and said cutout has a circumferential section extending in a direction substantially perpendicular to an axis of said trunnion, and first and second annular ridges forming boundaries between said circumferential section and said spherical surface.

3. The constant velocity universal joint according to claim 2, wherein a width of said circumferential section for constructing said cutout is set such that first and second lines are provided so that they form an angle of about 4 degrees to about 16 degrees in a plane including a tangential line contacting with a circle for connecting centers of said plurality of said trunnions, intersections formed between said spherical surface and said first and second lines are designated as said first and second annular ridges respectively, and said width is set by a spacing distance between said first and second annular ridges.

4. The constant velocity universal joint according to claim 2, wherein said circumferential section for constructing said cutout is provided with a helical groove which encircles said trunnion along its circumferential direction.

5. The constant velocity universal joint according to claim 2, wherein said circumferential section for constructing said cutout is provided with a sintered alloy embedded in an annular groove.

6. The constant velocity universal joint according to claim 2, wherein said circumferential section for constructing said cutout is provided with a plurality of irregularities.

7. The constant velocity universal joint according to claim 2, wherein said circumferential section for constructing said cutout is provided with a plurality of linear grooves extending substantially in parallel to said axis of said trunnion and spaced apart from each other by a predetermined spacing along a circumferential direction.

8. The constant velocity universal joint according to claim 1, wherein said oil-reserving section is composed of a cutout formed substantially an axis of said trunnion, said cutout including a part of said portion having said longest circumference of said trunnion and being substantially perpendicular to said portion having said longest circumference.

9. The constant velocity universal joint according to claim 1, wherein said oil-reserving section is composed of a helical groove formed on said spherical surface of said trunnion, said helical groove encircling said trunnion along its circumferential direction.

10. The constant velocity universal joint according to claim 1, wherein said oil-reserving section is composed of a sintered alloy embedded in an annular groove, said sintered alloy having an outer spherical surface which substantially conforms with said spherical surface of said trunnion.

11. The constant velocity universal joint according to claim 1, wherein said oil-reserving section is composed of a plurality of irregularities formed on said spherical surface of said trunnion, said irregularities being provided along a circumferential direction.

12. The constant velocity universal joint according to claim 1, wherein said oil-reserving section is composed of a plurality of linear grooves formed on said spherical surface of said trunnion, said linear grooves extending substantially in parallel to an axis of said trunnion and spaced apart from each other by a predetermined spacing along a circumferential direction.

13. The constant velocity universal joint according to claim 1, wherein said oil-reserving section is composed of a recess formed on said spherical surface of said trunnion.

14. A constant velocity universal joint having a cylindrical outer member coupled to one transmitting shaft and having, on an inner circumferential surface, a plurality of guide grooves spaced apart from each other by a predetermined spacing and extending along an axial direction, and an inner member coupled to the other transmitting shaft and inserted into an opening inner space of said outer member, said constant velocity universal joint comprising:

a plurality of trunnions each having a spherical surface and expanding towards said guide grooves;

cylindrical holders for surrounding said trunnions, to which roller members displaceable along said guide grooves are externally fitted; and an oil-reserving section disposed on each of said trunnions at a position at which said trunnions contact with inner wall surfaces of said holders, wherein said oil-reserving section is composed of at least one substantially circular bulge having a predetermined curvature which exceeds a curvature of said spherical surface of said trunnion.

15. A constant velocity universal joint having a cylindrical outer member coupled to one transmitting shaft and having, on an inner circumferential surface, a plurality of guide grooves spaced apart from each other by a predetermined spacing and extending along an axial direction, and an inner member coupled to the other transmitting shaft and inserted into an opening inner space of said outer member, said constant velocity universal joint comprising:

a plurality of trunnions each having a spherical surface and expanding towards said guide grooves;

cylindrical holders for surrounding said trunnions, to which roller members displaceable along said guide grooves are externally fitted; and an oil-reserving section disposed on each of said trunnions at a position at which said trunnions contact with inner wall surfaces of said holders, wherein said oil-reserving section is composed of at least one substantially circular flat section provided at a driving force-transmitting point on said trunnion.

* * * * *